United States Patent
Youd et al.

(10) Patent No.: US 9,124,699 B2
(45) Date of Patent: Sep. 1, 2015

(54) SYSTEMS AND METHODS FOR EXPERT COMMUNICATIONS

(75) Inventors: Timothy Youd, Los Angeles, CA (US); Jason Freeland, Los Feliz, CA (US); Vimalan Mahadevan, Sherman Oaks, CA (US)

(73) Assignee: OUTLOOK AMUSEMENTS, INC., Los Angeles, CA (US)

( * ) Notice: Subject to any disclaimer, the term of this patent is extended or adjusted under 35 U.S.C. 154(b) by 2052 days.

(21) Appl. No.: 11/800,608

(22) Filed: May 7, 2007

(65) Prior Publication Data

US 2007/0274495 A1 Nov. 29, 2007

Related U.S. Application Data

(60) Provisional application No. 60/798,366, filed on May 5, 2006.

(51) Int. Cl.
| | |
|---|---|
| *H04M 3/00* | (2006.01) |
| *H04M 5/00* | (2006.01) |
| *H04M 3/42* | (2006.01) |
| *H04M 3/523* | (2006.01) |

(52) U.S. Cl.
CPC .......... *H04M 3/5231* (2013.01); *H04M 3/5238* (2013.01); *H04M 2203/2072* (2013.01)

(58) Field of Classification Search
CPC . H04M 3/5233; H04M 3/5238; H04M 3/523; H04M 2203/2072
USPC ............... 379/210.01, 265.07, 265.08, 265.1, 379/265.12, 266.06
See application file for complete search history.

(56) References Cited

U.S. PATENT DOCUMENTS

| | | | | |
|---|---|---|---|---|
| 5,872,841 | A * | 2/1999 | King et al. ............... | 379/210.01 |
| 6,064,730 | A * | 5/2000 | Ginsberg ................. | 379/265.09 |
| 6,724,764 | B2 * | 4/2004 | Bondarenko et al. ......... | 370/401 |
| 2003/0126205 | A1 * | 7/2003 | Lurie ............................ | 709/204 |
| 2006/0277550 | A1 * | 12/2006 | Williams et al. .............. | 718/107 |

* cited by examiner

*Primary Examiner* — Nafiz E Hoque
(74) *Attorney, Agent, or Firm* — Mintz Levin Cohn Ferris Glovsky and Popeo P.C.

(57) ABSTRACT

Methods and systems for scheduling a communication between parties are presented. A system includes a wait-list module configured to determine and display information to a first party attempting to communicate with a second party. The system includes a wait-time prediction module configured to determine, based on the information determined by the wait-list module, an estimated wait time before the first party can be allowed to communicate with the second party. The system also includes a scheduling module configured to schedule a time when the first party can be allowed to communicate with the second party, wherein the scheduled time is determined by one of the first party and the second party based at least on the estimated wait time.

30 Claims, 13 Drawing Sheets

FIG. 6

| | |
|---|---|
| Psychic 1 Schedule of Appointments for Today: | |
| LOG ON | |
| 10:00 AM | Available |
| 11:00 AM | Direct Call from Caller A |
| 12:00 PM | Direct Call from Caller B |
| 1:00 PM | Available |
| 2:00 PM | Out-dial Caller C |
| 3:00 PM | Direct Call from Caller D |
| 4:00 PM | Out-dial Caller E |
| 5:00 PM | Available |
| 6:00 PM | Available |
| LOG OFF | |

SYSTEMS AND METHODS FOR EXPERT COMMUNICATIONS

CROSS-REFERENCE TO RELATED APPLICATIONS

The present application claims priority to U.S. Provisional Patent Application Ser. No. 60/798,366 to Mahadevan, filed May 5, 2006 and entitled "Systems and Method for Expert Communications". The present application relates to U.S. Provisional Patent Application Ser. No. 60/765,152 to Youd et al., filed Feb. 3, 2006 and entitled "Appointment Methods and Apparatuses". The present application also relates to U.S. patent application Ser. No. 11/701,634 to Youd et al., and entitled "Appointment Methods and Apparatuses". This application incorporates the entire contents of the above applications herein by reference.

BACKGROUND OF THE INVENTION

1. Field of the Invention

The present invention relates generally to the area of communication services. In particular, the present invention relates to systems and methods for scheduling calls between at least two parties.

2. Background of the Invention

Advising services have become very popular within the last 15 years, and currently, there are a fair number of companies rendering advice to individuals, groups and organizations. Such advising services may include legal, financial, medical, psychic/astrological, or any other expert and non-expert services. Psychic services are one such advising service and have grown tremendously over this time span. Individuals can speak with a psychic over the phone to obtain advice on the individuals' future, for example. As such psychic services grow, repeat users desire to talk with particular psychics. However, many customers of such services have been increasingly found that the particular psychic they wish to speak with is already engaged in a call with another customer.

This poses a problem for the psychic service company. Customer satisfaction in many circumstances corresponds to the ability of a customer to be connected with the psychic they desire. This issue is heightened when consideration is given to the psychic company's best customers (frequent users) and their best psychics (being high in demand).

Secondly, with the growth of psychic service businesses, there is a need to add quality psychics and astrologers to a company's network. A significant part of attracting and retaining quality psychics is compensation. Because psychics and astrologers are paid based on the time they are actually on a call performing a reading (as opposed to the amount of time they have made themselves available to take a call), the more time a psychic spends on calls during the time they have made themselves available, the higher the compensation.

Accordingly, there is a great need for a method (and corresponding apparatus/system) that would allow such companies to allow frequent users to be connected with desired, highly regarded psychics easily, as well as a method/system which helps psychics (or experts in other advising service companies) to more efficiently manage their time, yielding an advantage to the psychic services company to attract and retain top quality psychics and astrologers.

SUMMARY OF THE INVENTION

Accordingly, embodiments of the present invention address the above-note problems and concerns, and present systems and methods for scheduling telephone call appointments between at least two parties.

In some embodiments, the present invention is directed to a method for scheduling a call between parties. The method includes steps of providing a system for enabling a first party to schedule a call with a second party at a scheduled time period. The system includes a database having stored therein an availability of at least one first party for calls for a plurality of time periods. The method also includes steps of accessing the system by a second party, determining the availability of a specific first party for a call at a scheduled time period based on the plurality of time periods, selecting the scheduled time period by the second party for the call with the first party, and selecting, by the second party, a mode of the call between the second party and the first party at the scheduled time period. In a first mode, the system establishes communications with the second party and the system enables communications between the second party and the first party. In a second mode, the second party calls the first party directly.

In some embodiments, in a third mode, the second party establishes communications with the system, the system establishes communications with the first party and the system enables communications between the parties. In alternate embodiments, in a fourth mode, the system establishes communications with both the first party and the second party and the system enables communications between the parties. In yet other alternate embodiments, in a fifth mode, the first party establishes communications with the system, the system establishes communications with the second party and the system enables communications between the parties.

In alternate embodiments, the present invention is directed to a system for scheduling a call between parties. The system includes a call center. The call center may be configured to enable a first party to schedule a call with a second party at a scheduled time period. The call center includes a database having stored therein an availability of at least one first party for calls for a plurality of time periods. The call center may also be configured to allow access the call center by a second party, determine the availability of a specific first party for a call at a scheduled time period based on the plurality of time periods, select the scheduled time period by the second party for the call with the first party, select, by the second party, a mode of the call between the second party and the first party at the scheduled time period. In a first mode, the call center establishes communications with the second party and the call center enables communications between the second party and the first party. In a second mode, the second party calls the first party directly.

In some embodiments of the system, in a third mode, the second party establishes communications with the call center, the call center establishes communications with the first party and the call center enables communications between the parties. In alternate embodiments of the system, in a fourth mode, the call center establishes communications with both the first party and the second party and the call center enables communications between the parties. In yet other alternate embodiments of the system, in a fifth mode, the first party establishes communications with the call center, the call center establishes communications with the second party and the call center enables communications between the parties.

In some embodiments, the present invention relates to a system for scheduling a communication between parties. The system includes a wait-list module configured to determine and display information to a first party attempting to communicate with a second party; a wait-time prediction module configured to determine, based on the information determined by the wait-list module, an estimated wait time before the first party can be allowed to communicate with the second party; and a scheduling module configured to schedule a time when the first party can be allowed to communicate with the second party, wherein the scheduled time is determined by one of the first party and the second party based at least on the estimated wait time.

Some embodiments of the present invention relate to a method of scheduling communications between parties. The method includes steps of generating a wait list configured to determine and display information to a first party attempting to communicate with a second party; determining, based on the information determined by the wait-list module, an estimated wait time before the first party can be allowed to communicate with the second party; and scheduling a time when the first party can be allowed to communicate with the second party, wherein the scheduled time is determined by one of the first party and the second party based at least on the estimated wait time.

Further features and advantages of the invention, as well as structure and operation of various embodiments of the invention, are disclosed in detail below with references to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 6 illustrates an exemplary schedule of appointments for a psychic, according to the present invention.

DETAILED DESCRIPTION OF THE INVENTION

Some embodiments of the present invention present appointment programs which help solve the above noted problems by providing the customer with what they want—a conversation with a specific psychic, without having to wait in line for some indefinite period of time, and which allows psychics and astrologers to better manage their time.

Figure 1A:
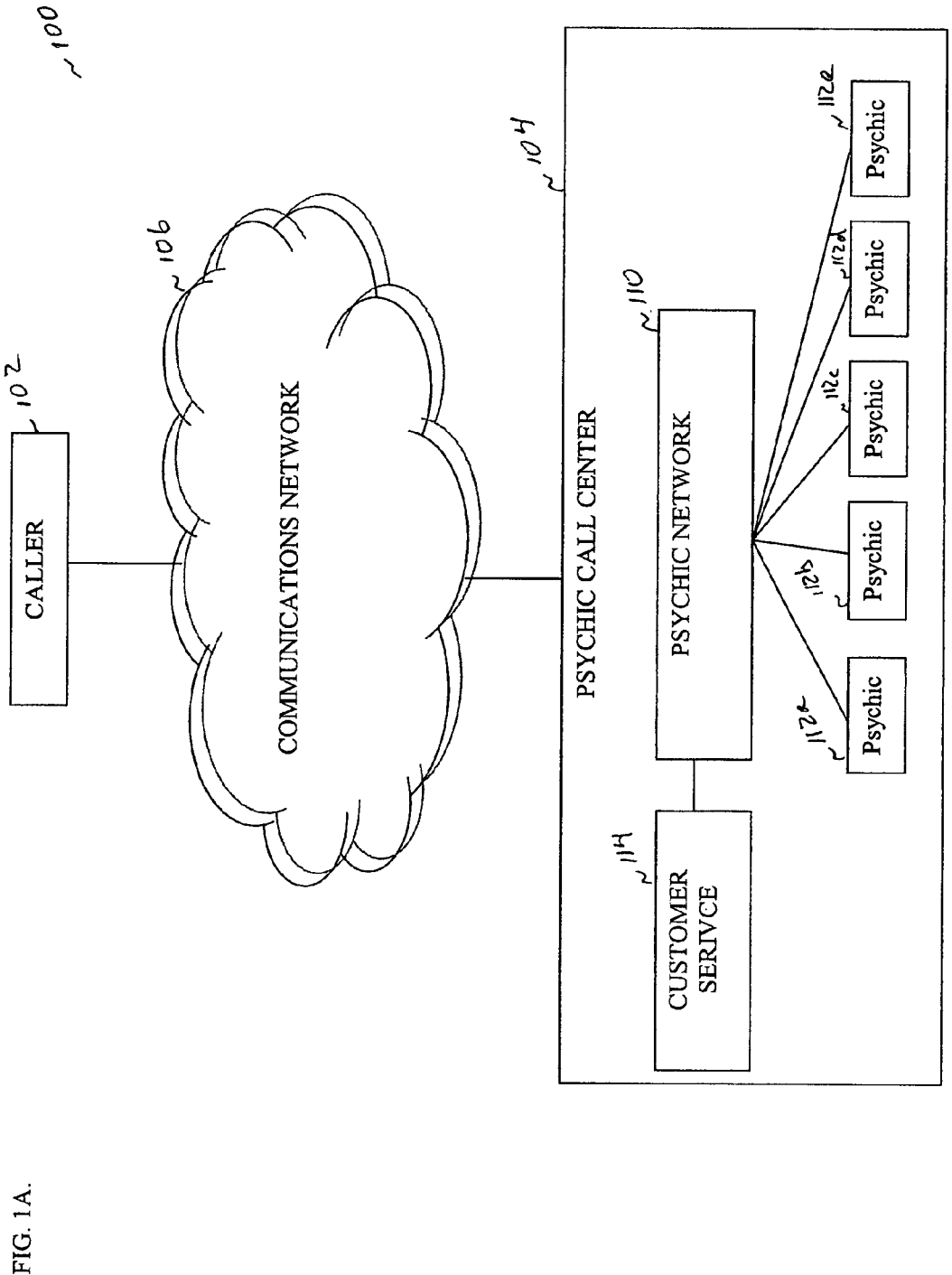
FIG. 1A illustrates an exemplary system for scheduling a call between a caller and a psychic, according to the present invention.

FIG. 1A illustrates an embodiment of a communications system 100 for making appointments with a psychic (or a legal, technical, financial, or any other advisor, or expert). For the purposes of the following description, the embodiments of the present invention will be discussed with regard to systems, methods and programs for making appointments with a psychic that may be selected by a user, the system, randomly, or in any other fashion. In the system 100, a user or a caller 102 can be configured to be connected to a psychic call center 104 via a communications system 106. The caller 102 may use a telephone (landline, wireless, or any other telephone) to dial the call center 104. Alternatively, the caller 102 may use a computer to connect with the call center 104. The caller 102 can communicate with the call center 104 using wired, wireline, wireless, and/or any other type of communications means. The caller 102 can also interact with a psychic or anyone/anything in the call center 104 using instant messaging, email, short message service (SMS) messages, or any other type of communications.

In an embodiment, the call center 104 may be configured to include a psychic network 110 configured to be connected to a plurality of psychic stations 112 (a, b, c, d) and to a customer service station 114. As can be understood by one skilled in the art, psychic stations 112 may include a telephone (landline, mobile, or otherwise), a computer, or any other communications device. When caller's 102 call is connected to the call center 104, it is routed to a selected psychic 112. The psychic 112 then responds to the call by answering the telephone, or answering an instant message, email, SMS, or performing any other task to connect with the caller 102.

The customer service station 114 may be configured to be connected to the psychic network 110 as well as the psychic stations 112. The customer service 114 may be further configured to schedule appointments for the caller 102, resolve any issues that either the caller 102 or the selected psychic 112 may have, monitor incoming calls, or perform any other functions. As can be understood by one skilled in the art, the communication system 100 is not limited to the embodiments described above.

In an embodiment, the system 100 may be configured to allow the caller 102 to call the psychic call center 104, select a psychic 112 with whom the caller 102 desires to speak, schedule an appointment with that psychic, speak with the selected psychic at a scheduled time by either calling the psychic at the scheduled time or having the psychic 112 (and/or the call center 104) call the caller 102 and connect the caller 102 with the selected psychic 112 at the scheduled time. The system 100 also may be configured to provide paid psychic services to the caller 102 and, thus, it may be further configured to collect payments from the caller 102. The payments may be made through credit cards, bank accounts, debit accounts, or any other means. The payments may be collected based on the duration of a call between the caller 102 and the selected psychic 112, popularity of the psychic 112, frequency of the caller 102 calling the selected psychic 112 or call center, day of the week, month, year, time of day, or any other factors. In an embodiment, prior to being connected to the selected psychic 112, the caller 102 may be requested to prepay a certain sum of money to be allowed to speak with the selected psychic and/or use services of the call center 104. After payment, the caller 102 may be given a particular number of credits/points. The credits can be equivalent to time (e.g., a number of minutes) during which the caller 102 can speak with the selected psychic 112. For example, if the caller 102 prepays $50.00 and it costs $25 per hour to speak with the caller-selected psychic 112 (equivalent to 1 credit per hour), the caller 102 can be given 2 credits and can speak with the selected psychic 112 for two hours.

In an embodiment, in order for the psychic 112 to speak with a caller, the psychic "logs on" to the call center system. After the psychic logs on to the system, the psychic becomes available to take calls from callers, make calls to the callers, and/or request the call center to connect the psychic 112 with the caller 102. As can be understood by one skilled in the art, "log on" process can include the psychic 112 entering a user name and a password (that identifies the psychic) into a computer at the psychic's station that is networked within the call center. This can activate psychic's computer, telephone and any other devices the psychic uses on the call center's network. It can also include the psychic 112 picking up the telephone at the psychic's station and dialing into the main call center line switch and providing identification information (specific to that psychic), such as a pin, to the switch, thereby activating psychic's line. As can be understood by one skilled in the art, other ways of the psychic connecting to the call center are possible. The psychic can also connect with the call center remotely, i.e., away from the psychic's station. The psychic may connect using wired, wireline, wireless or any other type of connection.

The call center 104 may be configured to operate in several modes. In an exemplary first mode, the call center establishes communications with the caller 102 and the call center enables communications (e.g., connects the call) between the caller 102 and the psychic 112. In an exemplary second mode, the caller 102 calls the psychic 112 directly. In an exemplary third mode, the caller 102 establishes communications (e.g., calls) with the call center 104, then the call center establishes communications (e.g., connects the call) with the psychic 112 and the call center enables communications (e.g., connects the call) between the caller and the psychic. In an exemplary fourth mode, the call center 104 establishes communications with both the psychic 112 and the caller 102 and the call center enables communications (e.g., connects the call) between the psychic 112 and the caller 102. In another exemplary mode, the psychic 112 establishes communications (e.g., calls) with the call center 104, the call center 104 establishes communications with the caller 102 and the call center 104 enables communications between the caller and the psychic.

Figure 1B:
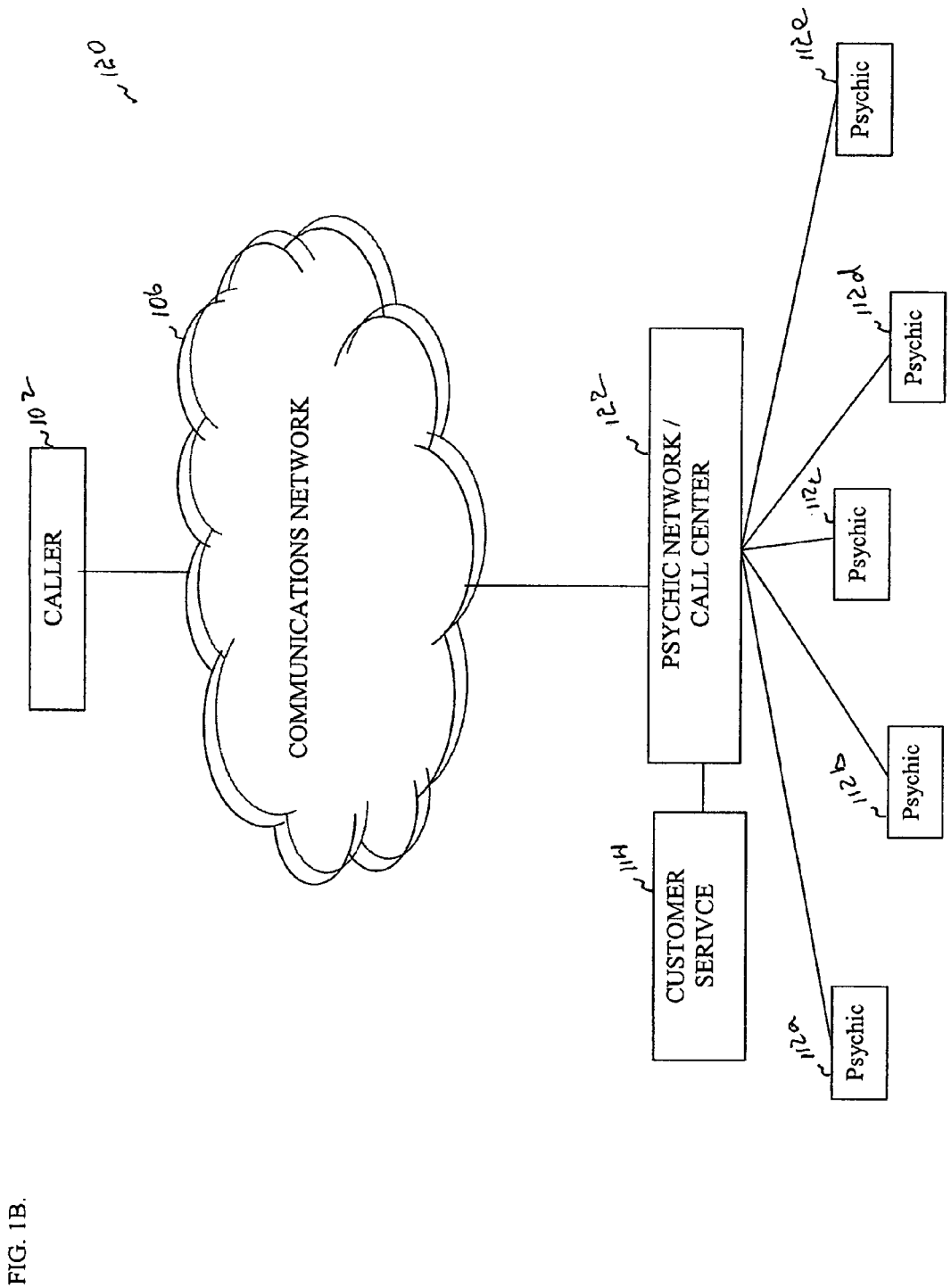
FIG. 1B illustrates another exemplary system for scheduling a call between a caller and a psychic, according to the present invention.

FIG. 1B illustrates an alternate embodiment of an exemplary communications system 120 for making appointments with a psychic (or a legal, technical financial, or any other advisor, or expert). The system 120 is similar to the system 100 discussed above. The caller 102 may use system 120 to connect to any one of the plurality of psychics 112 (a, b, c, d, e). The psychics 112 may be configured to be connected to a psychic network/call center 122. In an embodiment, the physical location of the psychics 112 may be different from one another and from the psychic/call center 122. This allows psychics 112 to communicate with callers 102 and the psychic network/call center 122 from any part of the world. This is also convenient for the purposes of the psychics 112 being on call at any time of the day. This particular feature of the present invention may accommodate callers 102 and psychics 112 that are located in various time zones. The psychic network/call center 122 may be also configured to connect to a customer service 114. Similar to psychics 112, the customer service 114 may also be separately located from the psychic network/call center 122 and/or the psychics 112. In an embodiment, there may be more than one customer service 114 configured to communicate with the psychic network/call center 122 and/or the psychics 112. In some embodiments, the present invention allows routing of calls based on geographical location of the caller 102, the psychic 112, and/or customer service 114. In some embodiments, the psychics 112 may be independent contractors working from their own facilities (e.g., homes) and hired for the purposes of providing advice to callers. As can be understood by one skilled in the art, a reference to call center 104 in this application may be interpreted as the reference to psychic network/call center 122. Thus, the following description is equally applicable to call center 104 and psychic network/call center 122. A reference to call center 104 is used for purely exemplary, illustrative, and non-limiting purposes.

Figure 2:
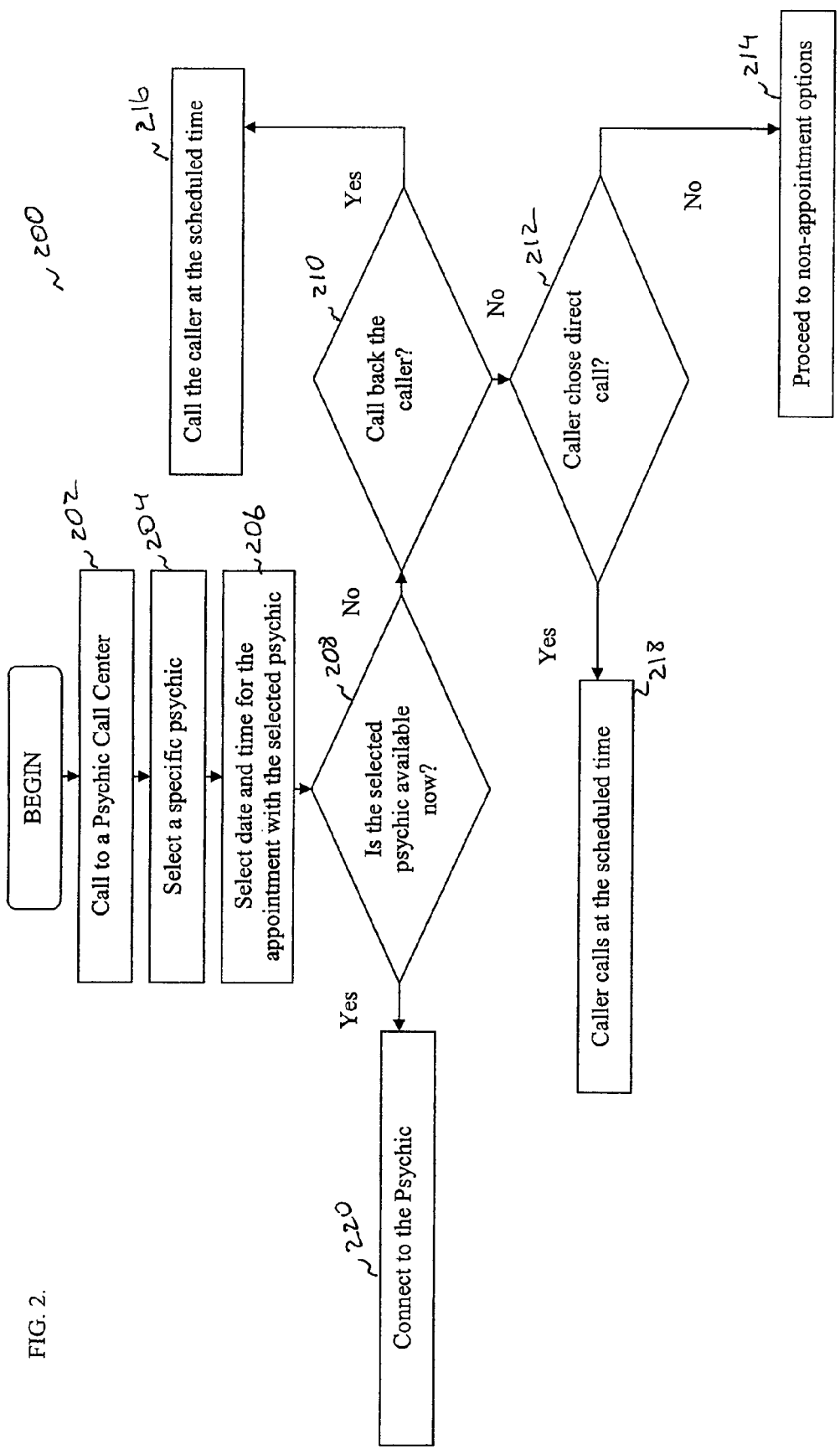
FIG. 2 is a flow chart illustrating an exemplary method for scheduling a call between a caller and a psychic, according to the present invention.

FIG. 2 illustrates an exemplary method 200 for scheduling an appointment with a specific psychic, according to the present invention. As stated above, the present invention allows the caller 102 upon calling center 104 (step 202) to select from available psychics 112 (step 204). In an alternate embodiment, the present invention may also be configured to randomly select a psychic 112 from available psychics. Once the psychic 112 is selected, the system is further configured to select a time and date for an appointment with the psychic (step 206). The appointment can be selected from available time-and-day appointment slots for that psychic. In an alternate embodiment, the caller 102 can be put into a queue for the selected psychic 112.

In an embodiment, if the selected psychic is not available at the time the caller 102 has called the psychic service (step 208), the caller 102 can be given various options. Those options include: (1) wait until the selected psychic becomes available; (2) schedule an appointment with the selected psychic and choose a call-back appointment by that psychic or call back at the scheduled time; (3) request to be directed to the customer service for any other options (e.g., select another psychic and request to be transferred to that psychic, speak to the customer service about any billing, password issues, etc.) (steps 210-218). If the psychic is available at the time of the call, the caller 102 is connected with the selected psychic 112 (step 220).

As stated above, it is understood by one skilled in the art that the examples described may be set up and operated via a computer network such as the world-wide-web/internet, and/or through a telephone system. For demonstration purposes only, particular embodiments of the invention will be described with the use of a system which utilizes the telephone system.

FIG. 3 illustrates an exemplary embodiment of a method 300 for scheduling a call between a customer of the system and a desired psychic. In step 302, a pre-scheduled appointment call is dialed in by a customer. As can be understood by one skilled in the art, the customer may call from customer's home phone number or any other number. In an embodiment, the caller ID may be checked to determine if the phone number is in a database of the psychic system that contains caller ID's of its customers. This is illustrated by step 304.

If the caller's number is not known or not stored in the caller ID database (i.e., of registered callers/users), the call may be directed to a series of "unknown" options, as indicated by step 306. The "unknown" options may include disconnecting the call (shown by step 307a), directing the call to an available psychic (step 307b), or directing the call to customer service/customer care specialist in the system (step 307c). As can be understood by one skilled in the art, other "unknown" options may be available.

If the caller's number is known or stored in the caller ID database, a determination is made whether the call was placed for a pre-scheduled appointment with a particular psychic. This is illustrated in step 308.

If it is not for a pre-scheduled appointment, then the call may be directed to one or more "non-appointment" options 312. The "non-appointment" options may include directing the call to an available psychic (step 313a), directing the caller to make an appointment with a particular psychic (step 313b), or directing the call to a customer service/customer care representative (step 313c). As can be understood by one skilled in the art, other "non-appointment" options may be available.

If the call is identified as having an appointment with a particular psychic, then a determination is made whether the call is placed/received within a predetermined time frame of the actual scheduled time. This is illustrated in step 314. In an embodiment, the call is received within the predetermined time frame of the actual scheduled time, when the call is received within a specific time, such as 2 minutes, before or after the appointment time.

The system then determines if the call came too late, as indicated by the decision step 316. If it is determined that the call was received too late, the system can be configured to play a pre-recorded message to the caller, as indicated in step 320. The message may state that the caller called after the scheduled appointment time and suggest any late-call options that may be available to the caller at this time, as illustrated by step 322. In an embodiment, the caller may be directed to a customer service/customer care representative (step 323a), or alternatively, the caller may be directed to schedule another appointment with the psychic (step 323b). As can be understood by one skilled in the art, other options may be available to the caller at this time.

If the call did not come too late, the system determines if the call came too early, as indicated by step 324. If it is determined that the call was received too early, the system can be configured to play a pre-recorded message to the caller, as indicated in step 326. The message may state that the caller called prior to the scheduled appointment time and suggest any early-call options that may be available to the caller at this time, as illustrated in step 328. In an embodiment, the caller may be directed to a customer service/customer care representative (step 329a), the caller may be directed to verify caller's correct time for the appointment with the psychic (step 329c), or wait until the scheduled time (step 329b).

If, in step 314, the system determines that the call was received within the predetermined time frame for the scheduled call, the system can be configured to play a message indicating that the caller will be connected to the caller-selected psychic, as indicated by step 318. Subsequently, the call may be connected as a conference call with the psychic, as indicated by step 330.

The method 300 then proceeds to step 332, where it is determined whether the call between the caller and the psychic is successfully connected. If it is not, the caller may be directed to customer service/customer care representative for resolution of the connection issues, as indicated by step 333. In an embodiment, the reasons for failure to connect may include caller's lack of funds in the caller's account with the system, entry of invalid caller identification information, e.g., caller's pin number, system failure, or any others.

If the conference call is successfully connected, then the system may be configured to play a message to the caller and/or generate audible tones to let the parties (caller and the psychic) know how much time has elapsed or is left for the scheduled call, as indicated by step 336. The recorded message that is played prior to the call connection may explain that the system will alert the parties to the time that is remaining or elapsed in the call. As can be understood by one skilled in the art, the system may be configured to generate alerts at various times, for example, at 30 minutes prior to the end of the call, then at 5 minutes prior to the end of the call, or at any other time.

The method 300 then proceeds to step 338, where the system determines whether the time scheduled for the call has elapsed. If the predetermined scheduled time has elapsed, the system may be configured to play a recorded message to the parties (e.g., the caller and the caller-selected psychic) on the conference call announcing the call has ended, as indicated by the step 340. Either party to the conference call may be prompted to proceed to select from "after-call" options, as indicated by step 342. Such options include scheduling another appointment with the same psychic (step 343a), scheduling appointment with another psychic (not shown), proceeding to another appointment (step 343b) (this maybe relevant for both the caller and the psychic), speaking with customer service/customer care representative (step 343c), hanging up (not shown), or others.

Figure 4:
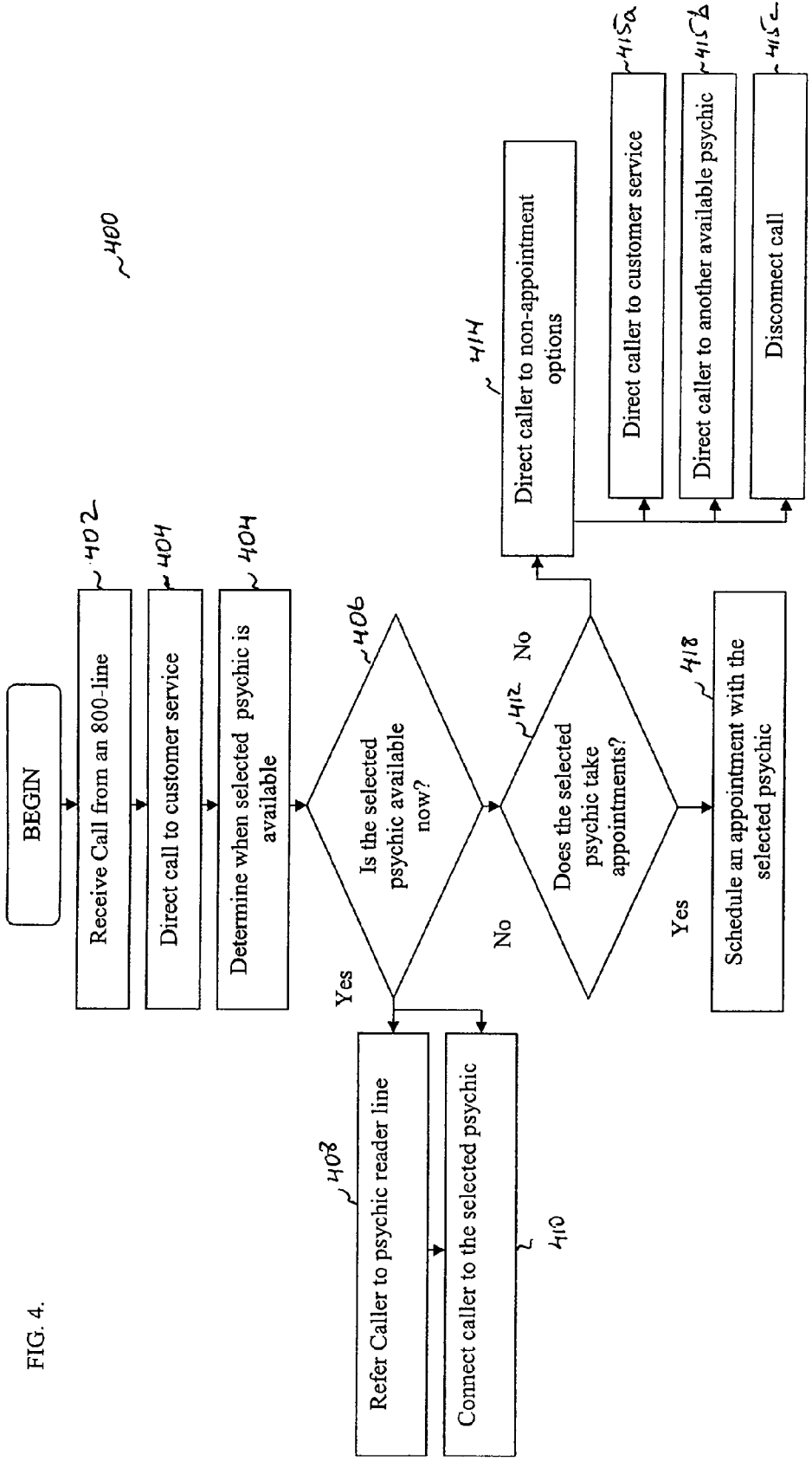
FIG. 4 is a flow chart illustrating yet another exemplary method for scheduling a call between a caller and a psychic, according to the present invention.

FIG. 4 illustrates an alternate embodiment of an exemplary method 400 for scheduling a call between at least two parties, according to the present invention. The method begins with step 402, where a caller contacts a psychic service. Such contact may come from a 1-800-number that is setup by the psychic service, specifically for these purposes. The caller is connected to psychic service's customer service to determine whether a desired psychic is available and, if not, when such psychic will be available for a call. The availability of the psychic is determined based on the psychic being logged on to the psychic service call system. This is illustrated by step 404.

In step 406, the system determines if the selected psychic is available. If the selected psychic is available at the time of the call, the system is configured to refer the caller to call a psychic reader line (e.g., another 800 number), as indicated by step 408. In an alternate embodiment, the caller can be directly connected to their selected psychic via a direct call (the system, in anther embodiment, may simply connect the customer to the psychic), as shown in step 410.

If the psychic is not available, the system will determine if the psychic takes appointments. This is shown in step 412. If the psychic does not take appointments, the system may be configured to present the caller with the "no appointments" options, as shown in step 414. Such options include querying the caller as to whether the caller wishes to select another psychic (step 415b), redirecting the caller to customer service/customer care representative (step 415a), disconnecting the call (step 415c), or any other options (not shown).

If the system determines that the psychic is able to make an appointment for the caller, the system may be configured to query the caller whether the caller wishes to schedule an appointment with the psychic, as shown in step 418. If the caller does not desire to schedule an appointment with this psychic, the system may be configured to direct the caller to the "no scheduling" options. The "no scheduling" options may include querying the caller whether the caller wishes to select another psychic for appointment scheduling purposes, directing the caller to customer service/customer care representative, or other options. If the caller desires to schedule an appointment with the selected psychic, the system sets up an appointment with the selected psychic at the time when both the psychic and the caller are available.

The present invention allows a caller to chose a specific time and date for speaking to a particular psychic, instead of queuing for an indeterminate period of time or being connected with another psychic. The present invention also allows a caller to setup an appointment that the caller can depend on at a single time (and most often at the touch of one button). An advantage of the present invention is that there is no back and forth between the psychic or system and the caller accepting and rejecting specific appointment times.

Other advantages of the present invention include: increase in ability to set proper customer expectations that in turn increases repeat customer sales and call-backs; reduction of costs (fewer calls into the call center from customers inquiring as to when their psychic will log on or will be available); and improve utilization of psychics, who now need only log onto the system (call in) to take calls when they have appointments, making their time better utilized (versus waiting for calls to come in).

In an embodiment, the above systems and methods can be configured to control selection of eligible psychics (or financial, legal, technical advisors, experts, or any other individuals) that participate in the appointment scheduling programs, according to the present invention. Further, the psychics that participate in the appointment program, as discussed above, can also participate in an out-dial program. The out-dial program allows the caller-selected psychic to call the caller at a scheduled time and date.

Figure 5:
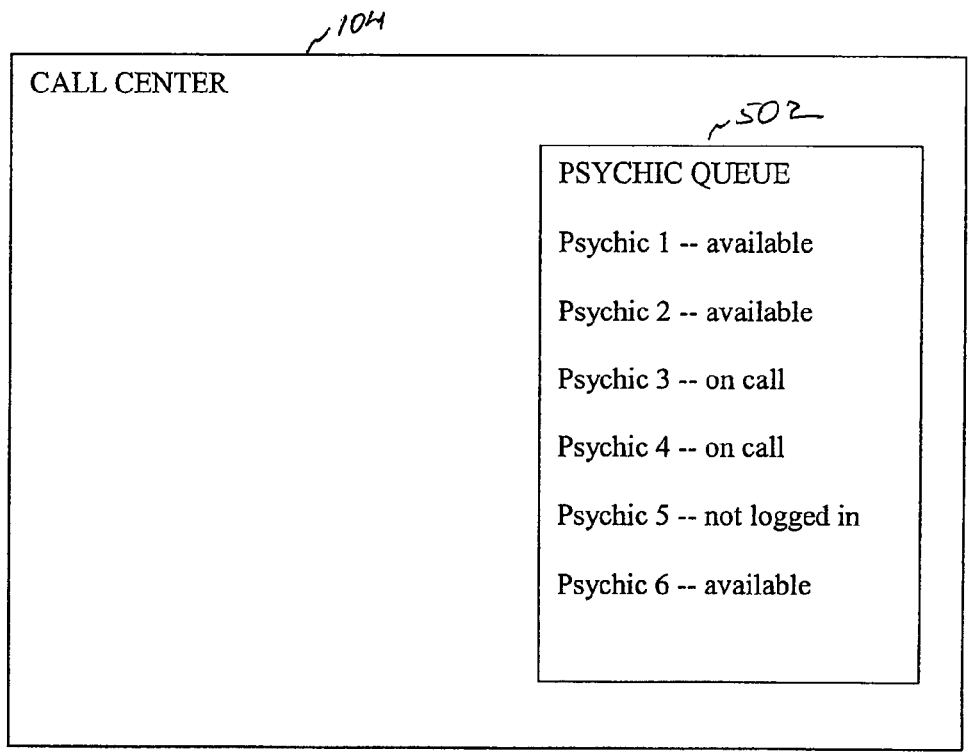
FIG. 5 illustrates an exemplary psychic queue, according to the present invention.

Further, the above systems and methods can be configured to have a queue of psychics that are available to take calls from callers. In an embodiment, the queue can include a list of psychics and an indication whether a particular psychic is available, as indicated in FIG. 5. The psychic queue 502 can be configured to be a part of the call center 104. The queue 502 lists psychics 1-6 and indicates their status. In an embodiment, the status can be "available", "on call", "not logged in", or, as can be understood by one skilled in the art, any other indication of the available/non-availability of a psychic. The queue 502 can further indicate when psychics will become available or when they will become non-available. For example, the psychic queue may indicate that a specific psychic will be become available (i.e., placed back into queue) in 5 minutes or that another psychic will not be available (i.e., removed from the queue) in 20 minutes.

In an embodiment, the psychics can be placed back into the psychic queue 502 at the end of the appointment. Thus, if a psychic has an appointment from 12 PM PST to 1 PM PST, the psychic's status in the queue 502 will be "on call" (or any other indication of unavailability of the psychic). But at 1 PM PST, that psychic will be placed into the psychic queue 502 and psychic's status will be changed to available. This way the psychic is able to take additional calls from the callers. If the psychic has another appointment at 1 PM PST, then that psychic's status may remain as "on call" or "unavailable". In an embodiment, the present invention can be configured to block psychic's line (e.g., telephone line, instant message communication path, etc.), or change psychic's status to unavailable, at a specified time (e.g., 10 minutes) prior to the scheduled appointment. This way, the psychic's availability is guaranteed for scheduled appointment and the psychic does not have to interrupt any conversations/consultations in order for the psychic to go to another appointment.

In an embodiment, if a caller misses his/her appointment by a specified amount of time (e.g., 5 minutes), the appointment is considered missed. Thus, the psychic that was not available for other callers because of the scheduled appoint with that particular caller, is put back into the queue and the psychic's availability is changed to "available".

Figure 3A:
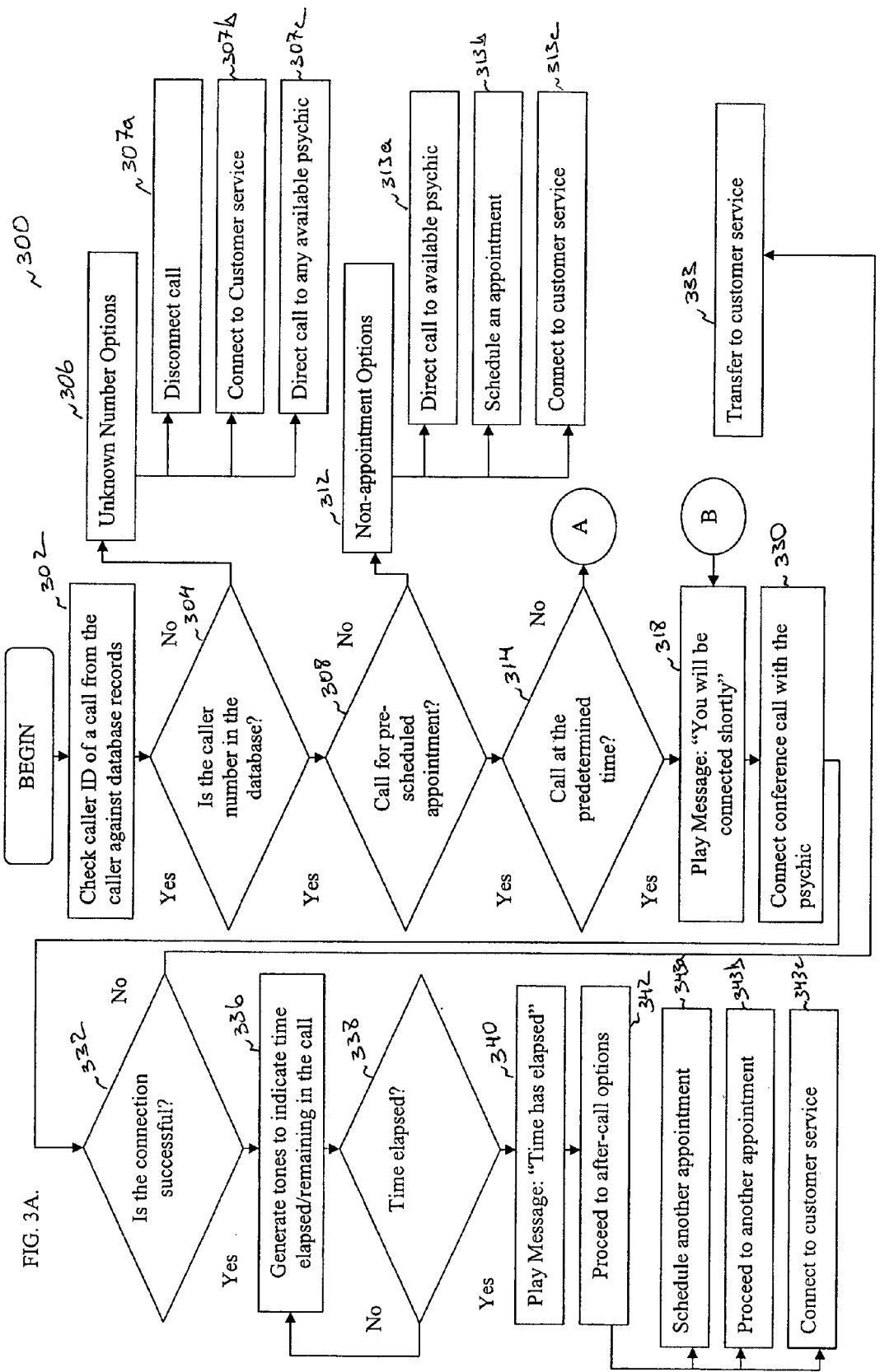
FIGS. 3A-B are flow charts illustrating another exemplary method for scheduling a call between a caller and a psychic, according to the present invention.
Figure 3B:
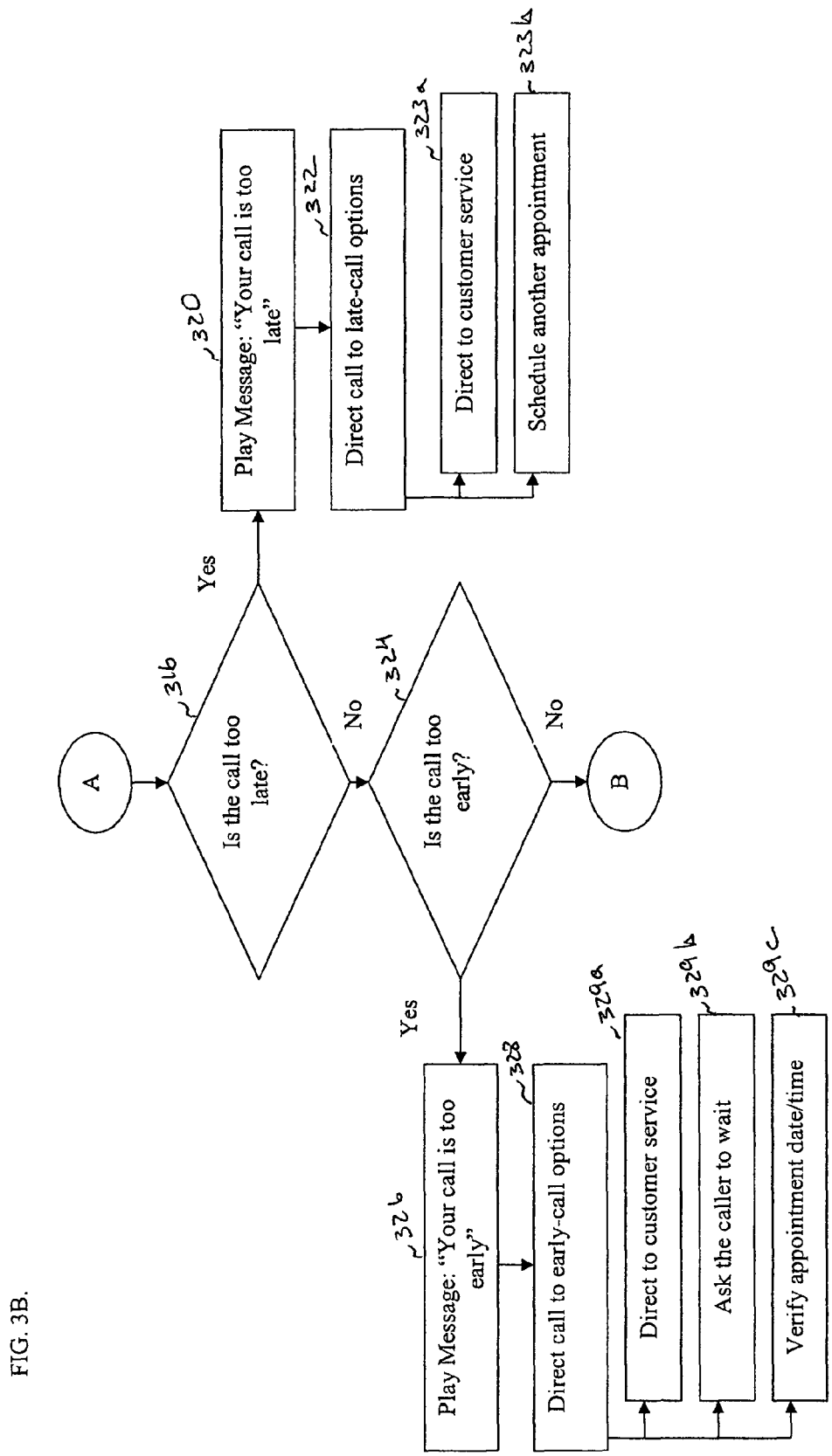

As discussed with regard to FIGS. 3A and 3B, the present invention is configured to warn the caller and the psychic during the call (whether scheduled as an appointment or a random call) how much time remains in the call. If the psychic has an appointment with a caller, and is currently on a call with another caller (whether appointment or regular call), the psychic and/or the current caller can be warned that time is running out before psychic will have to get off the line and proceed to another appointment with another caller. In an embodiment, only the psychic can be warned. The warnings can be done by way of playing a warning tone, playing a recorded message indicating time left. In an embodiment, the warning system can also be extended to indicate to the psychic and/or the caller how many available minutes (or credits) the caller has on the caller's account to speak with the psychic.

In an embodiment, when a psychic is logged on to the system, the system may be configured to indicate psychic's schedule for a particular day, as illustrated in FIG. 6. The schedule may appear on a computer screen, printed on paper, or delivered to the psychic in any other way. As illustrated in FIG. 6, the psychic 1 is available at 10:00 AM, 1:00 PM, 5:00 PM, and 6:00 PM. This means that the psychic is available to take calls from callers without pre-scheduled appointments. Additionally, psychic's availability may be changed during those times if a caller calls in to schedule an appointment during that day. Further, psychic 1 has direct calls from callers A, B, and D at 11:00 AM, 12:00 PM, and 3:00 PM, respectively. This means that the psychic 1 has scheduled appointments with these callers and should expect to receive a call from them. Hence, the psychic's status at those times may be indicated as unavailable in the psychic queue 502 (shown in FIG. 5). As stated above, if the psychic does not receive calls from either of these calls or receives them late, then the system will consider the appointments missed and the psychic 1 will be available to other callers. Finally, psychic 1 has out-dial calls to callers C and E at 2:00 PM and 4:00 PM, respectively. This means that the psychic will be calling callers C and E at scheduled times.

In an embodiment, in order for a caller to schedule with a specific psychic, the present invention may be configured to direct the caller to a customer service/customer care representative to schedule a call. In an alternate embodiment, the appointments may be scheduled automatically. The caller may dial the call center 104 and be directed to an automated service menu, where the caller is able to select among psychics working in the center. Once the psychic is selected, the caller is presented with an option to book an available time slot for an appointment with the selected psychic. This is subject to the psychic being available and/or taking new appointments from callers (whether new or returning callers). The present invention can be configured to request the caller to confirm the appointment with the psychic. Once the appointment is confirmed, the caller may either proceed to the appointment (i.e., the present invention will connect the caller to the selected psychic), hang up and call back or request call back at the scheduled time (depending on the option chosen by the caller), or connect with customer service for resolution of any other issues.

In an embodiment, the appointments with psychics can be booked in pre-set increments, such as 10 minutes, 20 minutes, 30 minutes, 1 hour, etc. As can be understood by one skilled in the art, other time intervals are possible. The caller can request to schedule back-to-back appointments with the selected psychic. In an embodiment, the caller may be limited to a specific number of appointments per specified period of time (e.g., 1 hour) with the selected psychic or with all psychics combined. This may prevent a particular caller occupying too much time of a particular psychic. If a particular psychic is popular, other callers may wish to speak with the psychic, and thus availability of that psychic for the particular user may be limited by the system.

In an embodiment, the present invention may be configured to request the caller to create an account with the system. Caller's account may include information about the caller, which includes personal information, payment information, psychic preferences, number of calls made to the psychic call center, number of calls made to specific psychics, length of time spent on a call with a specific psychic, summary of advice given by the specific psychic to the caller, and any other information. Further, in an embodiment, the psychic may access caller's account for the purposes of viewing prior advice, payment information, or any other information. Alternatively, caller's account may be maintained private. As stated above, the caller is able to access the account, and hence, connect with a select psychic, using the above pin code.

The present invention may also be configured to request payment from the caller scheduling an appointment with the psychic prior to being connected to the psychic or requesting a call back from the psychic. The system may request the caller to enter payment information, such as, credit card information, payment account information, or any other payment information. After payment information is received, the caller is given a specific number of credits that can be used to pay for the time that the caller spends on the call with the selected psychic. In an alternate embodiment, the caller is given a password or a pin to protect caller's privacy and allow the present invention to access caller's account with the system.

In an embodiment, after scheduling an appointment with a specific psychic, the caller may be given a specific call number (such as an 800-number) for call back at the scheduled appointment time. Once the caller calls in at the scheduled appointment time by dialing the provided specific call number, the caller is requested to enter the above pin code. Once, the pin code is entered, the caller is connected to the selected psychic, as discussed above with regard to FIGS. 2-4. FIGS. 2-4 also discuss options available to the caller if the caller is either early or late for the scheduled appointment. The callers are further able to reschedule, cancel, and/or modify amount of time for their appointments.

In an embodiment, the system in the present invention can be configured to provide incentives to their callers. The callers can be designated as VIP or special callers, if those callers are frequent callers to the system. As can be understood by one skilled in the art, other criteria in designating callers as VIP or special can be used. Such status allows callers to be given discounts on psychic services, options to purchase additional time at discounted rate, options to add more time to the appointment (either at the beginning, at the end or during the appointment) at discounted rate or for free, or any other options.

For example, in case of one-hour appointments, if the caller and the psychic have spoken less than 40 minutes, the caller may be offered to purchase 20 additional minutes. If the caller and the psychic have spoken for more than 40 minutes and the psychic does not have another scheduled appointment following the appointment with this caller, the caller may be offered to purchase 20 additional minutes. As can be understood by one skilled in the art, other incentives may be offered to callers.

Some embodiments of the present invention relate to communication call-back (e.g., telephone, chat, messaging) systems and methods. More particularly, some embodiments of the present invention relate to methods and systems for determining a wait time and scheduling communications with an expert in a particular field. Such fields can be legal, financial, medical, financial, psychic/astrological or any other expert or non-expert services field. Experts may also include counselors, advisors, or any other qualified individuals. These embodiments incorporate all of the features of the present invention discussed above with regard to FIGS. 1A-6. As can be understood by one skilled in the art, the systems depicted in FIGS. 1A and 1B are applicable to these embodiments of the present invention as well.

In some embodiments, the present invention relates to a communication method and system that enables users/customers to:

(1) view an expected wait time to speak with a particular expert (e.g., service technician, doctor, lawyer, psychic), or any expert;

(2) view the expert's schedule, waiting list, and/or related information to determine an estimated wait time for users already in a queue for the particular expert (or experts) and/or the total number of users in queue;

(3) schedule a telephone call-back, or, for example, instant messaging/chat, email, mobile communications and SMS messaging (hereinafter "call-back");

(4) cancel a previously scheduled call-back; and/or (5) acquire recommendations on alternate experts if a particular expert is unavailable.

Some of the embodiments of the present invention also include:

(1) an ability to change/edit the phone number for the call-back;

(2) an ability to change the medium of the call-back to email, text-messaging, etc;

(3) an ability to provide multiple call-back options; and/or (4) an inclusion of a payment/reward system for use of the system.

Figure 7:
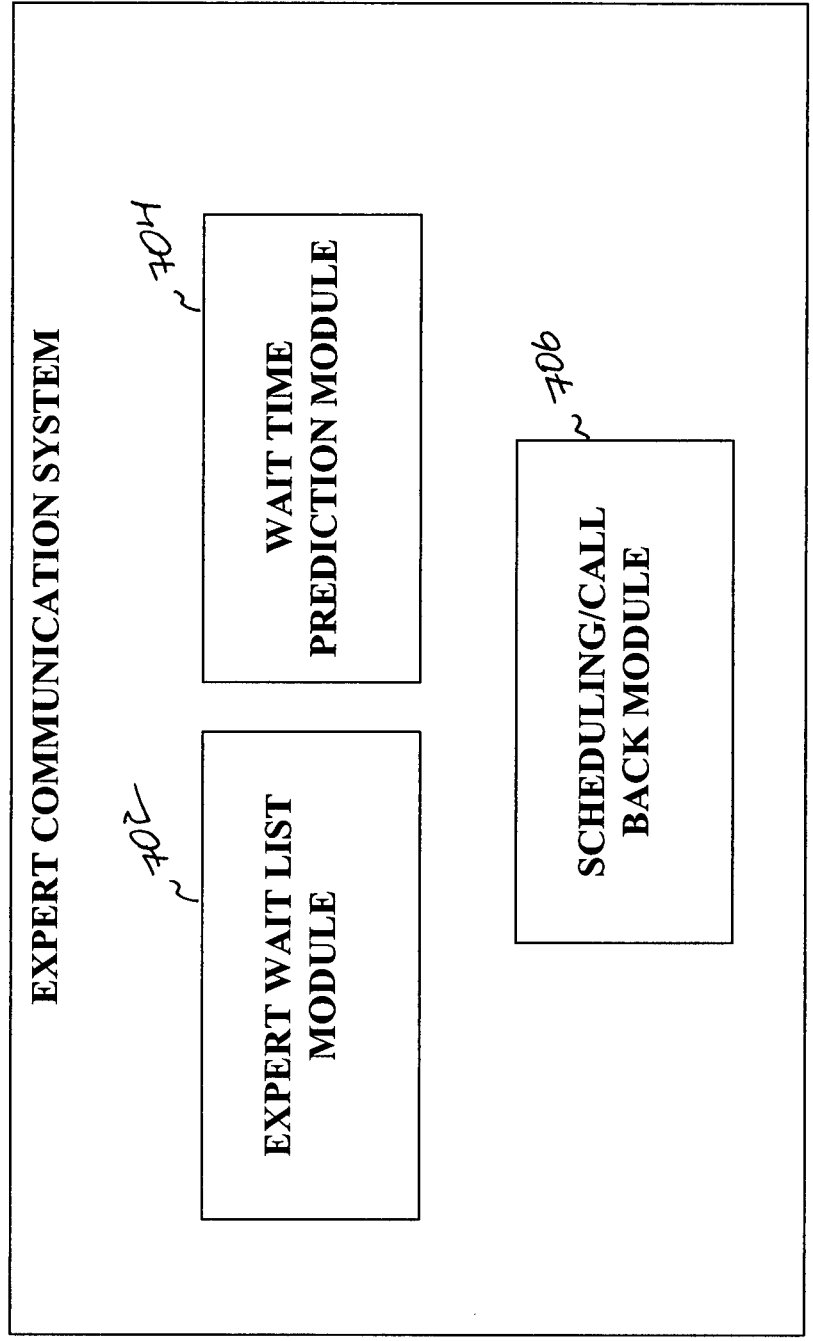
FIG. 7 illustrates an exemplary expert communication system, according to the present invention.

FIG. 7 illustrates an exemplary expert communication system 700 configured to connect callers (or users, customers, etc.) with experts, according to the present invention. The expert communication system 700 can be disposed in the customer service 114 (shown in FIGS. 1A-B), call center 104 (shown in FIG. 1A), network 110 (shown in FIG. 1A (or network/call center 122 (shown in FIG. 1B)), or anywhere in the systems 100 or 120 (shown in FIGS. 1A-B). As can be understood by one skilled in the art, systems 100 and 120 are not limited to psychic communications systems and can include any other expert and non-expert communication systems.

Expert communication system 700 includes an Expert Wait List module 702, Wait Time Prediction module 704, and Scheduling/Call Back Module 706. In an embodiment, modules 702, 704, and 706 can be configured to employ a number of elements governed by predetermined business rules and logic that determine information to be displayed, when the information is to be displayed, and how the information is to be displayed. Such information can be configured to be displayed to users, experts, system administrators, or any other persons associated with the systems 100 or 120. In an embodiment, certain rules and logic are configured to apply to different subsets of users/customers and, as such, each user's interface may differ from the other user. The information that can be displayed to the user is discussed above with regard to FIGS. 1A-6.

Figure 8:
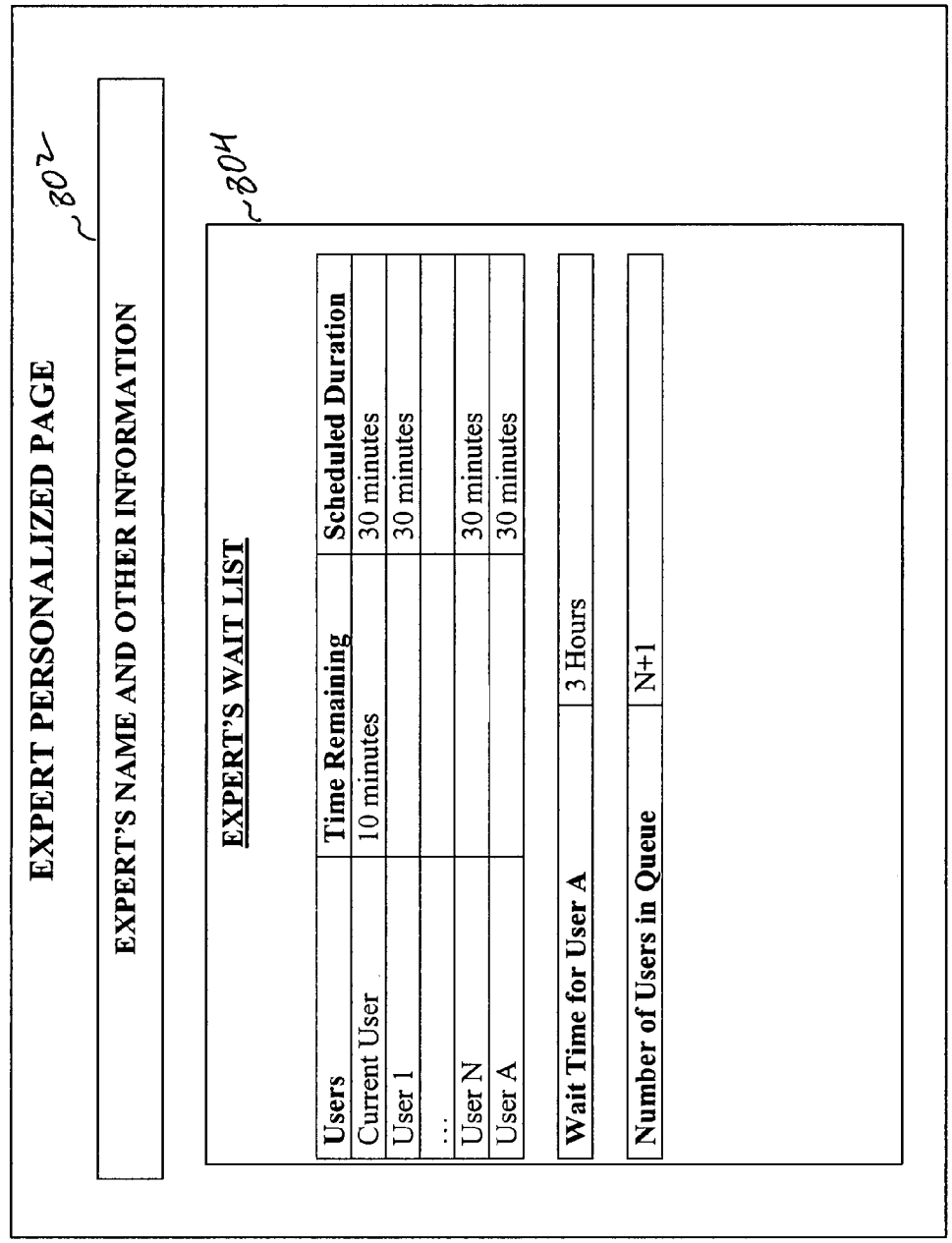
FIG. 8 illustrates an exemplary personalized expert web page, according to the present invention.

Referring back to FIG. 7, Expert Wait List module 702 can be configured to allow users to access a particular expert's wait list via a link on a personalized expert's page. Expert's page can be configured to be displayed along with expert's schedule (e.g., calling schedule). FIG. 8 illustrates an exemplary expert's page 800. Expert's page 800 can be displayed to the user once the user connects to the call center/network.

In an exemplary embodiment, the user may be using Internet (World Wide Web) to access call center and the expert web page in order to receive a desired expert advice. Thus, the page 800 can be expert's web page. The page 800 can be displayed on the user's desktop computer, laptop computer, PDA, mobile telephone, or any other device that can be configured to convey expert's information to the user. Alternatively, the user may be using a telephone and the information can be audibly conveyed to the user via a telephone by way of a voice-recognition software/system. As can be understood by one skilled in the art, other methods of conveying expert information and expert wait list information to the user are possible.

In some embodiments, the page 800 can be configured to include expert's name and other information block 802. In block 802, the expert may also provide his/her qualifications, curriculum vitae, expertise in a particular field (e.g., medicine, science, finance, psychiatry, astrology, etc.), as well as links to other websites (including links to other experts). The page 800 is configured to include expert's wait list block 804. In an embodiment shown in FIG. 8, the expert wait list may be a table that illustrates the number of users in the queue including "Current User", i.e., a user that is currently speaking with the expert, User 1 . . . . User N, i.e., users that are waiting to speak with the expert, User A, i.e., a user that is not in the expert's queue of users but has accessed expert's page and is trying to determine whether or not to join expert's queue. The wait list block 804 is configured to display applicable times, such as time that is remaining in the conversation of the current user and the expert (i.e., "Time Remaining") and scheduled duration of a call between each user and the expert (i.e., "Scheduled Duration"). The Scheduled Duration time is an indication of a scheduled duration (e.g., 1 hour, 30 minutes, 15 minutes, etc.) of a call that each user may specify when he/she wishes to speak with an expert. Additionally, the expert wait list block 804 can be configured to display a number of users in expert's queue. In the embodiment shown in FIG. 8, the number of users in the queue is N+1. This number does not include User A, since he/she did not yet join the queue. Further, the block 804 is configured to display information with regard to how much time user A has to wait to speak with the expert (as shown in FIG. 8, the wait time for User A is 3 hours). Based on this information, User A may decide whether or not to join the expert's queue and be put on the wait list. In an alternate embodiment, the expert's page 800 can be configured to display information as to whether the selected expert's queue is full and that the expert does not take any more calls and/or newly signed up users (e.g., those users that have not previously communicated with the selected expert). If the expert's queue is full or the expert does not take new users, the expert communication system 700 can be configured to display a message informing the user that the expert's queue is full (e.g., the message to the user can state: "We are sorry, but this expert has reached the limit for waiting callers") and/or that the expert does not take new users. The system 700 may also prompt the user to select another expert that may be available. Such selection is discussed above with regard to FIGS. 1A-6 and can be done on the basis of ratings or other parameters relating to experts (e.g., user ratings of experts, feedback, expert qualifications, or any other parameters). The expert's web page 800 can also be configured to allow the User A to schedule call back with the expert. To schedule a call-back with the expert, a call back scheduler can be used; it is discussed below with regard to FIG. 10. If a particular expert does not use waiting lists, the user may be prompted to call the call center and make an appointment with the expert (e.g., the message to the user can state: "We are sorry, this expert does not use an online waiting list. Please call 1-800-123-4567 for an appointment"). Additionally, if the expert does not use online wait lists, i.e., a user is not able to access selected expert's web page and/or the expert does not display or in any way allow unauthorized (or first-time users) or any users to determine what this expert's wait list is, the user may be prompted to call the call center to join selected expert's wait list (e.g., the message to the user can state: "We are sorry, this expert does not use an online waiting list. Please call 1-800-123-4567 to join this expert's waiting list").

Figure 9:
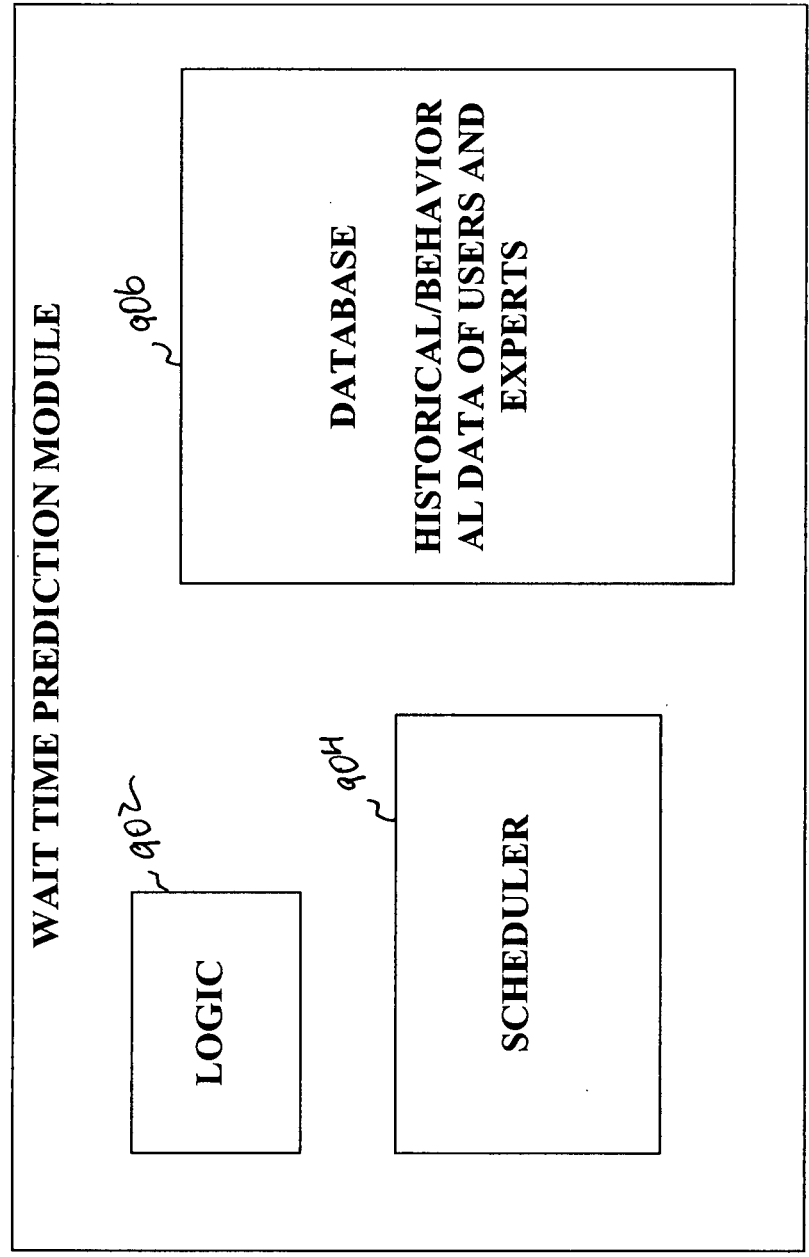
FIG. 9 illustrates an exemplary wait time prediction module, according to the present invention.

FIG. 9 illustrates an exemplary embodiment of the wait time prediction module 900, according to the present invention. The module 900 is configured to include a logic block 902, a scheduler block 904, and a database block 906. The module 900 can be configured compute estimated wait time for an expert (a particular expert or any/all experts) and display such information to the user in the expert's waiting list (as shown in FIG. 8). The estimated wait time can be computed using logic block 902 that employs predetermined business logic and information contained in the database block 906 that contains historical user/customer and expert behavioral information/data. In an embodiment, the scheduler block 904 can contain information about expert's schedules for a particular day, selected days, or all days on which the expert can be available. This information can also be used for in calculation of wait time for the selected expert.

Figure 10:
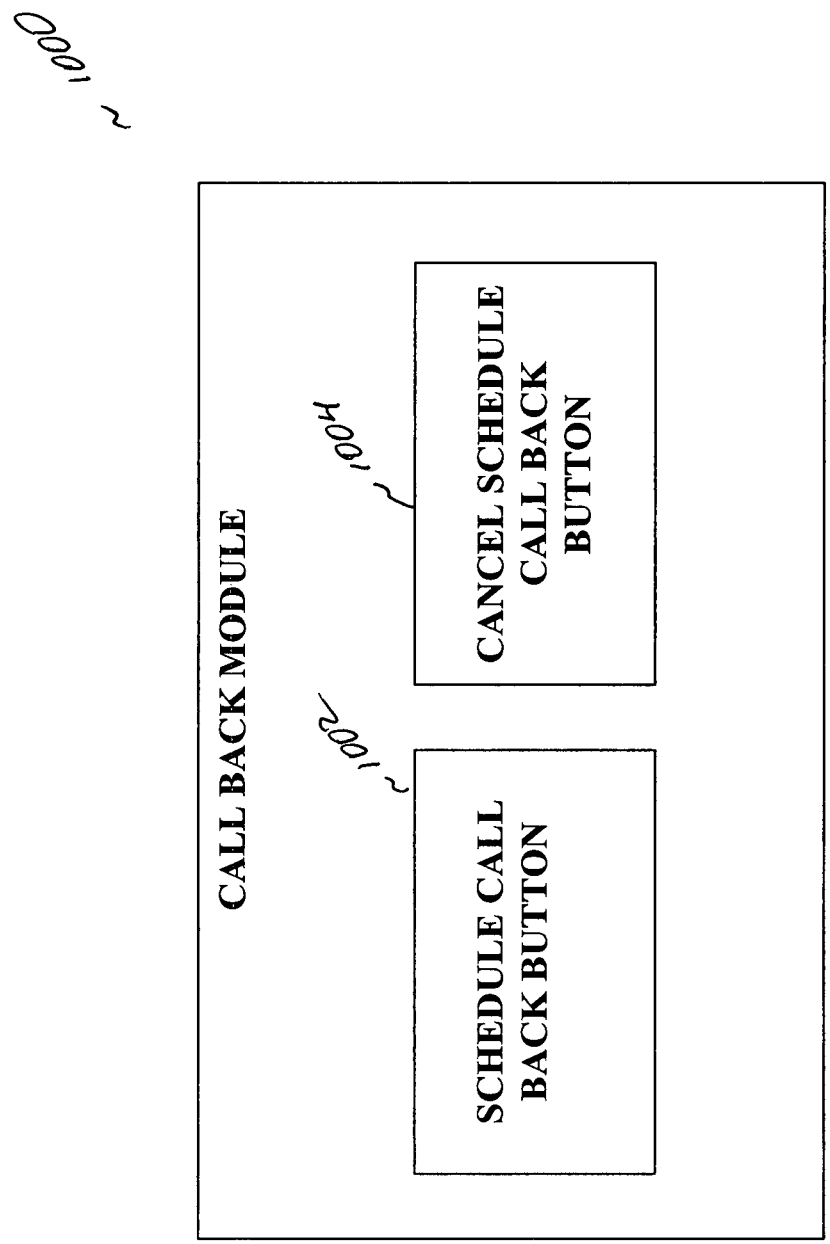
FIG. 10 illustrates an exemplary call back module, according to the present invention.

If the user has chose an expert that is not available at the time the user called, the user can be prompted to select an option of having the expert call back the user at a predetermined time (alternatively, the user can call the expert back at a selected time). The call-back option is also discussed above with regard to FIGS. 1A-6. FIG. 10 illustrates an exemplary call back module 1000, according to an embodiment of the present invention. The module 1000 includes schedule-call button 1002 and cancel schedule call back button 1004. The schedule-call button 1002 can be configured to allow the user to schedule a call back from the expert, if the expert is not available at the time the user calls. The cancel-schedule-call-back button 1004 can be configured to allow the user to cancel the call-back from the expert, even after the user schedules a call-back. In an embodiment, users can schedule a call-back in "real time" (or substantially in real time) via the button 1002 (alternatively, the button 1002 can be a link provided in the user interface for the expert's schedule (not shown in FIGS. 8-10)). In some embodiments, the call-back request is subject to verification and if accepted, the user can then view their position in the queue (See, FIG. 8). Users with a previously scheduled call-back can cancel the call-back via a button/link 1004 in the expert's waiting list. In both cases, wait times may be adjusted, as desired. Further, some embodiments of the invention include the ability of a user to contact the system, via a telephone, for example, and be updated on the wait time for a call-back. Such feature can be configured to include computer-controlled synthesized speech.

Figure 11:
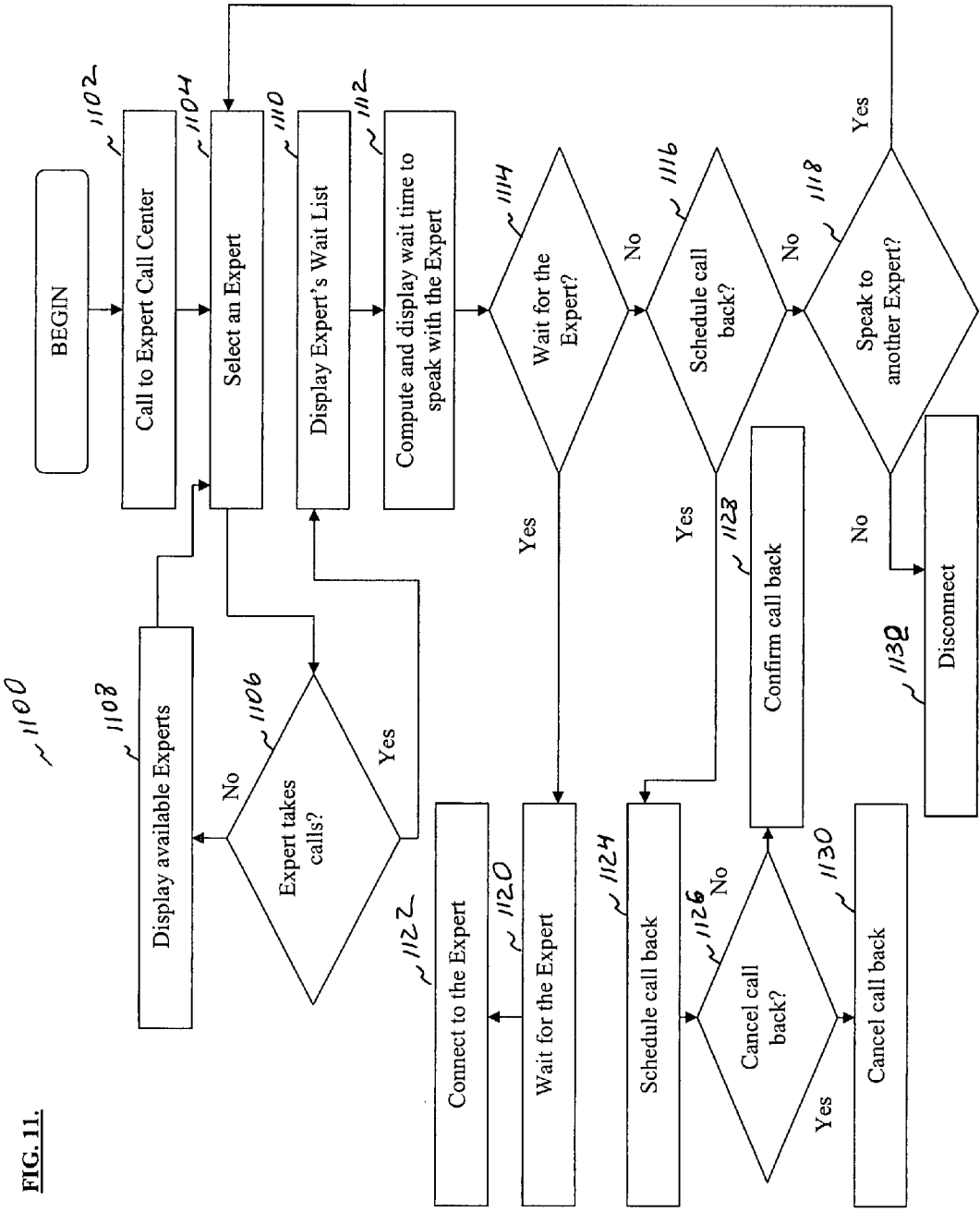
FIG. 11 is a flow chart illustrating an exemplary method for scheduling communication with an expert, according to the present invention.

FIG. 11 illustrates an exemplary method 1100 for expert communications, according to the present invention. In step 1102, a user calls to the expert call center (see, FIGS. 1A-B) in order to speak with an expert. The user can access the call center via telephone, internet, mobile telephone, or any other suitable means. The communications between the user and the call center can be using wired, wireline, wireless, LAN, WAN, or any other communications (whether networked or not).

In step 1104, the user selects an expert that he/she desires to speak with. The expert can be in the field of finance, medicine, science, astrology, psychic, or any other field. In an embodiment, the user may be presented with an option to select the field that the user needs an expert in and then based on that field select a particular expert. Alternatively, the user may be presented with a directory of expert-names and the user can then select the desired expert. The experts can also be selected automatically by the system. The system can select the experts based on ratings of each particular expert. As can be understood by one skilled in the art, other ways of selecting the desired expert are possible.

In step 1106, the system determines whether the selected expert takes calls from users. The expert may be unavailable because the expert's queue is full and the expert is not accepting any users. Alternatively, the expert may refuse to accept new users beyond those that the expert is already working with.

If the expert is not taking any calls from users for whatever reason, the system can be configured to display a list of available experts that may be useful to the user. This is illustrated in step 1108. The experts may be listed according to their ratings or other parameters. The user is then prompted to select another expert and go back to step 1104. If the user does not wish to select another expert, the user may disconnect from the system (not shown in FIG. 11).

If it is determined that the expert takes calls from users, the method proceeds to step 1110. In step 1110, the selected expert's wait list is displayed to the user. The wait list is discussed above with regard to FIG. 8.

The method also computes and displays wait time for the user to speak with the selected expert. This is illustrated in step 1112. Computation of the wait time is done using wait time prediction module illustrated in FIG. 9.

Based on the displayed wait time, the user will be prompted to decide whether or not to wait for the expert, as illustrated in step 1114. If the user decides to wait for the expert (step 1120), then after the expert finishes his/her conversations with the users that are in the expert's queue and are in front of the user, the user is connected with the expert (step 1122).

If the user does not wish to wait for the expert, the method proceeds to step 1116. In step 1116, the user is prompted to schedule a call-back with the expert. By scheduling a call-back, the user may request the expert to call the user at a predetermined time or the user can call the expert at the predetermined time. (See, FIGS. 1A-6 for more detailed discussion on scheduling appointments with experts).

If call-back is scheduled (step 1124), the user may be prompted with an option to cancel call-back, as illustrated in step 1126. If the user wishes to cancel call back, the method proceeds to step 1130 to cancel call back. The call-back is cancelled using the call-back module 1000 illustrated in FIG. 10. If the user does not wish to cancel the call back, the user then confirms the call back, as illustrated in step 1128. Confirmation of the call back can be done using the same module 1000.

If the user does not wish to schedule a call-back with the selected expert, the method proceeds to step 1118. In step 1118, the user can decide whether he/she wishes to speak with another expert. If, so, the method proceeds to step 1104, where the user can select another expert. If not, the method may prompt the user to disconnect from the system (step 1132), or follow any other option/prompt discussed above with regard to FIGS. 2-4.

Example embodiments of the methods and components of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed:

1. A system for scheduling a communication between parties, comprising:
   a wait-list module configured to determine and provide information to a first party in the plurality of first parties attempting to communicate with a particular second party in a plurality of second parties;
   a wait-time prediction module configured to determine, based on the information determined by said wait-list module, an estimated wait time before said first party can be allowed to communicate with said second party, said information includes a schedule of said second party at a time said second party is configured to access the system for scheduling a communication between parties, said estimated wait time is determined based on a time when said first party accessed the system, a queue of a portion of said plurality of first parties attempting to communicate with said second party, a number of appointments and a length of time corresponding to each appointment contained in said schedule of said second party, availability status of said second party, and a length of time remaining on an appointment contained in said schedule of said second party at the time said first party accessed the system; and
   a scheduling module configured to schedule a time when said first party can be allowed to communicate with said second party, wherein said scheduled time is determined by one of said first party and said second party based at least on said estimated wait time.

2. The system according to claim 1, wherein said wait-list module is configured to determine and provide at least one of:
   a calling-parties-breakdown list configured to provide a party currently communicating with said second party, other parties waiting to communicate with said second party and said first party;
   a length of time that each said party will communicate with said second party;
   a total number of parties waiting to communicate with said second party; and
   a total wait time for said first party to communicate with said second party.

3. The system according to claim 1, wherein said wait-time prediction module is configured to present said estimated wait time to said first party using display and/or sound.

4. The system according to claim 1, wherein said scheduling module is configured to cancel said time when said first party can be allowed to communicate with said second party.

5. The system according to claim 1, wherein said second party is an expert.

6. The system according to claim 1, wherein said scheduling module is further configured to confirm said time when said first party can be allowed to communicate with said second party.

7. The system according to claim 6, wherein when said time when said first party can be allowed to communicate with said second party is confirmed, said first party is configured to view:
   said time when said first party can be allowed to communicate with said second party, said wait time before said first party can be allowed to communicate with said second party, and a position of said first party in a queue of other parties waiting to communicate with said second party.

8. The system according to claim 1, wherein said estimated wait time is configured to be determined using a predetermined business logic and a database containing information concerning historical behavior of communication between said second party and other parties.

9. The system according to claim 1, wherein said first party is configured to initiate communication with said second party at said time when said first party can be allowed to communicate with said second party.

10. The system according to claim 1, wherein said second party is configured to initiate communication with said first party at said time when said first party can be allowed to communicate with said second party.

11. The system according to claim 1, wherein said wait list module is configured to determine whether said second party accepts communication from said first party.

12. The system according to claim 1, wherein said scheduling module configured to schedule a time when said first party can be allowed to communicate with said second party substantially in real time.

13. The system according to claim 1, wherein said schedule of said second party is a predetermined schedule having a plurality of time periods during which said second party is configured to be scheduled to communication with at least one party; and said first party and said second party are configured to be scheduled to communication during a predetermined period of time in said plurality of time periods.

14. The system according to claim 1, wherein said schedule of said second party is configured to allow said first party to instantly communicate with said second party upon accessing the system for scheduling the communication between parties provided said second party has accessed the system and is not scheduled to communication with any other party and is not communicating with any other party at the time said second party accessed the system.

15. The system according to claim 1, wherein said schedule of said second party is determined based on at least one of the following: a calling-parties-breakdown list configured to provide a party currently communicating with said second party, other parties waiting to communicate with said second party and said first party, a length of time that each said party will communicate with said second party, a total number of parties waiting to communicate with said second party, a total wait time for said first party to communicate with said second party, and historical behavior of communication between said second party and other parties.

16. A method of scheduling communications between parties, comprising the steps of:
generating a wait list configured to determine and provide information to a first party in the plurality of first parties attempting to communicate with a particular second party in a plurality of second parties;
determining, based on the information determined by said wait-list module, an estimated wait time before said first party can be allowed to communicate with said second party, said information includes a schedule of said second party at a time said second party is configured to access a system for scheduling a communications between parties, said estimated wait time is determined based on a time when said first party accessed the system, a queue of a portion of said plurality of first parties attempting to communicate with said second party, a number of appointments and a length of time corresponding to each appointment contained in said schedule of said second party, availability status of said second party, and a length of time remaining on an appointment contained in said schedule of said second party at the time said first party accessed the system; and
scheduling a time when said first party can be allowed to communicate with said second party, wherein said scheduled time is determined by one of said first party and said second party based at least on said estimated wait time.

17. The method according to claim 16, wherein said generating step further comprises
determining and providing at least one of:
a calling-parties-breakdown list configured to provide a party currently communicating with said second party, other parties waiting to communicate with said second party and said first party;
a length of time that each said party will communicate with said second party;
a total number of parties waiting to communicate with said second party; and
a total wait time for said first party to communicate with said second party.

18. The method according to claim 16, wherein said determining further comprises presenting said estimated wait time to said first party using display and/or sound.

19. The method according to claim 16, wherein said scheduling further comprises cancelling said time when said first party can be allowed to communicate with said second party.

20. The method according to claim 16, wherein said second party is an expert.

21. The method according to claim 16, wherein said scheduling further comprises confirming said time when said first party can be allowed to communicate with said second party.

22. The method according to claim 21, wherein said confirming further comprises displaying:
said time when said first party can be allowed to communicate with said second party,
said wait time before said first party can be allowed to communicate with said second party, and
a position of said first party in a queue of other parties waiting to communicate with said second party.

23. The method according to claim 16, further comprising determining said estimated wait time using a predetermined business logic and a database containing information concerning historical behavior of communication between said second party and other parties.

24. The method according to claim 16, further comprising initiating communication with said first party by said second party.

25. The method according to claim 16, further comprises initiating communication with said second party by said first party.

26. The method according to claim 16, further comprising determining whether said second party is configured to accept communication from said first party.

27. The method according to claim 16, wherein said scheduling further comprises scheduling a time when said first party can be allowed to communicate with said second party substantially in real time.

28. The method according to claim 16, wherein said schedule of said second party is a predetermined schedule having a plurality of time periods during which said second party is configured to be scheduled to communication with at least one party; and said first party and said second party are configured to be scheduled to communication during a predetermined period of time in said plurality of time periods.

29. The method according to claim 16, wherein said schedule of said second party is configured to allow said first party to instantly communicate with said second party upon accessing the system for scheduling the communication between parties provided said second party has accessed the system and is not scheduled to communication with any other party and is not communicating with any other party at the time said second party accessed the system.

30. The method according to claim 16, wherein said schedule of said second party is determined based on at least one of the following: a calling-parties-breakdown list configured to provide a party currently communicating with said second party, other parties waiting to communicate with said second party and said first party, a length of time that each said party will communicate with said second party, a total number of parties waiting to communicate with said second party, a total wait time for said first party to communicate with said second party, and historical behavior of communication between said second party and other parties.

\* \* \* \* \*